United States Patent
Dairoku et al.

(10) Patent No.: US 7,816,445 B2
(45) Date of Patent: Oct. 19, 2010

(54) PRODUCTION METHOD FOR HYDROPHILIC POLYMER

(75) Inventors: Yorimichi Dairoku, Himeji (JP); Yoshiro Mitsukami, Himeji (JP); Yoshio Irie, Himeji (JP); Shin-ichi Fujino, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 253 days.

(21) Appl. No.: 11/638,580

(22) Filed: Dec. 14, 2006

(65) Prior Publication Data

US 2007/0149701 A1 Jun. 28, 2007

(30) Foreign Application Priority Data

Dec. 22, 2005 (JP) ............................... 2005-370860

(51) Int. Cl.
*C08L 33/02* (2006.01)
(52) U.S. Cl. .................. 524/700; 524/556; 526/72; 526/89; 526/317.1
(58) Field of Classification Search .............. 524/52, 524/503, 556, 700, 734; 526/72, 89, 200, 526/202, 317.1
See application file for complete search history.

(56) References Cited

U.S. PATENT DOCUMENTS

| 4,320,040 | A | 3/1982 | Fujita et al. |
| 4,826,917 | A | 5/1989 | Kondo et al. |
| 2002/0040095 | A1* | 4/2002 | Dairoku et al. ............. 524/832 |
| 2002/0161132 | A1* | 10/2002 | Irie et al. ................ 525/329.7 |
| 2005/0113542 | A1* | 5/2005 | Irie et al. ................ 526/317.1 |
| 2005/0215734 | A1 | 9/2005 | Dairoku et al. |

FOREIGN PATENT DOCUMENTS

| JP | 54-37188 | 3/1979 |
| JP | 55-38863 | 3/1980 |
| JP | 62-270607 | 11/1987 |

OTHER PUBLICATIONS http://www.nichidene.com/Eng/kkh/b/b-2.htm.*
Belle Lowe (http://chestofbooks.com/food/science/Experimental-Cookery/Starch-Part-3.html). Book publised 1943.*
Zschimmer & Schwarz (http://www.tandem-chemical.com/principles/zschimmer/ceramics_aux/special_info/E_PVAzubereitungen%5B1%5D.pdf), downloaded Dec. 4, 2009.*
Saxena (ftp://ftp.fao.org/es/esn/jecfa/cta/CTA_61_PVA.pdf), published 2004.*
Chemistry/Engineering Handbook, modified version No. 6, edited by Chemistry/Engineering Committee, Maruzen Co. 1999.
Search Report dated Jun. 3, 2008 in corresponding European Patent Application No. 06026110.4.

* cited by examiner

Primary Examiner—David Wu
Assistant Examiner—Vu A Nguyen
(74) Attorney, Agent, or Firm—Harness, Dickey & Pierce, P.L.C.

(57) ABSTRACT

The subject invention provides a hydrophilic polymer (water-absorbing resin) which is superior in performance and productivity. According to the production method of the present invention, a hydrophilic high-molecular-weight compound is dispersed in an aqueous solution containing a hydrophilic monomer. The dispersed hydrophilic high-molecular-weight compound is dissolved by heat of neutralization (heat of hydration) and/or heat of polymerization generated in the process of producing a hydrophilic polymer.

24 Claims, 1 Drawing Sheet

PRODUCTION METHOD FOR HYDROPHILIC POLYMER

This Nonprovisional application claims priority under 35 U.S.C. §119(a) on Patent Application No. 2005/370860 filed in Japan on Dec. 22, 2005, the entire contents of which are hereby incorporated by reference.

FIELD OF THE INVENTION

The present invention relates to a production method for hydrophilic polymer. More specifically, the present invention relates to a production method for hydrophilic polymer in which a powder compound which is solid at ordinary temperature, like a hydrophilic high-molecular-weight compound, such as starch or polyvinyl alcohol (PVA), is dissolved in a monomer aqueous solution by heat of neutralization and/or heat of polymerization generated in the production process. The method of the present invention thus polymerizes a monomer.

BACKGROUND OF THE INVENTION

In recent years, water-absorbing resin, a typical hydrophilic polymer, is widely used for various sanitary goods such as paper diaper, sanitary napkin, adult incontinence product, water retaining agent for soil etc., and its production and consumption are both increasing. Particularly, a sanitary product such as paper diaper, sanitary napkin, or adult incontinence product is often made thin by constituting it of a large amount of water-absorbing resin and a small amount of pulp fiber. In view of this, there has been a demand for a water-absorbing resin with a large absorption against pressure, and a demand for cost reduction because a single sanitary product consumes a large amount of water-absorbing resin. For this reason, there has been a need for reduction in energy consumption and waste amount in the manufacturing line of water-absorbing resin, and also a need for finding a rational production method.

Desired properties of the water-absorbing resin include high water-absorbency, salt tolerance, low water soluble content, high absorption speed, and high gel strength. To improve these properties, some prior arts suggest a method of using a powder compound which is solid at ordinary temperature, like a specific hydrophilic high-molecular-weight compound such as starch or polyvinyl alcohol, in the process of polymerizing an unsaturated monomer in the production of the water-absorbing resin (see Documents 1 through 3). More specifically, the polymerization process has been modified many times by carrying out monomer polymerization with such a specific hydrophilic high-molecular-weight compound in order to ensure viscosity improvement of the monomer, graft polymerization, crosslinking etc.

A hydrophilic high-molecular-weight compound, which is a water-soluble high-molecular-weight compound such as polyvinyl alcohol type polymer or polyacrylamide type polymer generally has a powder form, and most of the time is dissolved in water to be an aqueous solution before added to the monomer. When such powder of water-soluble high-molecular-weight compound is supplied to ordinary-temperature water at once, it results in "fish eyes". Therefore, the powder is generally dispersed in cold water or is gradually put into water while stirred, and then the temperature is gradually increased while stirring the solution to dissolve the powder.

However, in the foregoing method in which a hydrophilic high-molecular-weight compound solution is prepared in advance before added to the monomer solution, a process of preparing a hydrophilic high-molecular-weight compound solution has to be carried out before the step of actually preparing the water-absorbing resin, and this pre-process needs a dissolving tank with a cooling device and a heating device and a pump for transferring the resulting viscose aqueous solution, which all cause extra expense and time. Further, in actual preparation, even in the case of using "starch" which is not likely to cause "fish eyes" among the various hydrophilic high-molecular-weight compounds, it sill requires a complicated process of heating up the dispersion solution to 60° C. or more so as to produce an α-starch. Further, it is necessary to ensure that the monomer in the polymerizing aqueous solution has a high concentration so as to increase productivity and reduce cost, but it is difficult to be achieved if the hydrophilic high-molecular-weight compound solution is dilute. However, high concentration hydrophilic high-molecular-weight compound solution will make dissolving process more troublesome, and the resulting solution will be highly viscous, which is difficult to be treated. Therefore, in the recent mass production of water-absorbing resin, the method of using a hydrophilic high-molecular-weight compound in the form of hydrophilic high-molecular-weight compound solution significantly hinders improvement in productivity.

[Document 1]
Japanese Laid-Open Patent Application Tokukaisho 55-38863 (published on Mar. 18, 1980)(corresponding patent publication: Tokukosho 62-921 (published on Jan. 6, 1987)

[Document 2]
Tokukaisho 62-270607 (published on Nov. 25, 1987)(corresponding foreign patent: U.S. Pat. No. 4,826,917 (published on May 2, 1989)

[Document 3]
Tokukaisho 54-37188 (published on Mar. 19, 1979)

SUMMARY OF THE INVENTION

The present invention is made in view of the foregoing problems, and an object is to provide a method for producing a hydrophilic polymer superior in performance, with desirable productivity.

The inventors of the present invention intensively worked on the foregoing problems, and found a way of directly dissolving a powder compound, which is solid at ordinary temperature, in a monomer solution by using heat of neutralization (heat of hydration) and/or heat of polymerization generated in the production process of hydrophilic polymer. The inventors thus completed the present invention.

In order to achieve the foregoing objective, the present invention provides a production method for a hydrophilic polymer by way of polymerization of a hydrophilic monomer in a solution, the method comprising the steps of: (1) mixing a solution containing a hydrophilic monomer and a compound which disperses in the solution, so as to prepare a dispersion solution of the compound; and (2) polymerizing the hydrophilic monomer in the solution, and heating the dispersion solution by heat of polymerization generated by the polymerization, so as to dissolve at least a part of the compound dispersed therein.

As compared with the described conventional production methods, the method for producing the hydrophilic polymer of the present invention can significantly improve the productivity and produce high-performance hydrophilic polymer.

More specifically, the production method for hydrophilic polymer according to the present invention includes a preparation step in which the compound dispersed in a solvent is dissolved into the solvent by heat of polymerization. In this manner, the present invention allows to omit the extra step of preparing a solvent of powder compound which is solid at ordinary temperature, such as starch or polyvinyl alcohol (PVA), which step was conventionally required before the process of producing the hydrophilic polymer (eg. water-absorbing resin). The present invention thus simplifies the production step of the hydrophilic polymer, and also reduces the production cost.

Further, for example, in the case of using starch, the conventional method requires a complicated process of heating up the dispersion solution to 60° C. or more so as to produce an α-starch before the dissolving process. On the other hand, the method of the present invention takes an easy step of dissolving the compound dispersed in a monomer solution into the solution by heat of polymerization, thereby evenly dissolving the compound into the solution. Therefore, even in mass production of water-absorbing resin, the manufacturing does not require a great burden of work for adjustment, or a large amount of hydrophilic polymer solution. On this account, the productivity of water-absorbing resin is ensured even in mass production.

Note that, "dissolve at least a part of the compound dispersed therein" indicates a process of dissolving 30 weight % or greater of the mixture amount (regarded 100%) of the compound at the time where the compound is mixed with the solvent. The dissolving amount is preferably 50 weight % or greater, more preferably 80 weight % or greater, most preferably 100 weight %.

In order to achieve the foregoing objective, the present invention provides a production method for a hydrophilic polymer by way of polymerization of a hydrophilic monomer in a solution, the method comprising the steps of (a) mixing a solution containing a monomer containing an acid group and a compound which disperses in the solution, so as to prepare a dispersion solution of the compound; (b) mixing the dispersion solution with a neutralizing agent capable of neutralizing the monomer containing an acid group so as to neutralize the monomer containing an acid group; and heating the dispersion solution by heat of neutralization and/or heat of hydration generated by the neutralization, so as to dissolve at least a part of the compound dispersed therein; and (c) polymerizing the monomer containing an acid group in the dispersion solution having been neutralized in the step (b).

As compared with the conventional production methods, the method for producing the hydrophilic polymer of the present invention can improve the productivity and produce high-performance hydrophilic polymer.

More specifically, the production method for hydrophilic polymer according to the present invention includes a preparation step in which the compound dispersed in a solvent is dissolved into the solvent by heat of neutralization and/or heat of hydration generated in the neutralization process. In this manner, unlike the conventional method which first prepares a hydrophilic high-molecular-weight compound solution ("compound" of the present invention) and then adds the solution, the present invention allows to omit the extra step of preparing a hydrophilic high-molecular-weight compound solution before the process of producing the hydrophilic polymer (eg. water-absorbing resin). The present invention thus simplifies the production step of the hydrophilic polymer, and also reduces the production cost.

Further, for example, in the case of using starch, the conventional method requires a complicated process of heating up the dispersion solution to 60° C. or more so as to produce an α-starch before the dissolving process. On the other hand, the method of the present invention takes an easy step of dissolving the compound dispersed in a monomer solution into the solution by heat of polymerization, thereby evenly dissolving the compound into the solution. Therefore, even in mass production of water-absorbing resin, the manufacturing does not require a great burden of work for adjustment, or a large amount of hydrophilic polymer solution. On this account, the productivity of water-absorbing resin is ensured even in mass production.

Note that, "dissolve at least a part of the compound dispersed therein" indicates a process of dissolving 30 weight % or greater of the mixture amount (regarded 100%) of the compound at the time where the compound is mixed with the solvent. The dissolving amount is preferably 50 weight % or greater, more preferably 80 weight % or greater, most preferably 100 weight %.

In order to achieve the foregoing objective, the present invention provides a production method for a hydrophilic polymer by way of polymerization of a hydrophilic monomer in a solution, the method comprising the steps of (a) mixing a solution containing a monomer containing an acid group and a compound which disperses in the solution, so as to prepare a dispersion solution of the compound; (b) mixing the dispersion solution with a neutralizing agent capable of neutralizing the monomer containing an acid group so as to neutralize the monomer containing an acid group; and heating the dispersion solution by heat of neutralization and/or heat of hydration generated by the neutralization, so as to dissolve a part of the compound dispersed therein; and (c) polymerizing the monomer containing an acid group in the dispersion solution having been neutralized in the step (b), and dissolving at least a part of the compound dispersed in the dispersion solution having been neutralized.

As compared with the conventional production methods, the method for producing the hydrophilic polymer of the present invention can improve the productivity and produce high-performance hydrophilic polymer.

More specifically, the production method for hydrophilic polymer according to the present invention includes a preparation step in which the compound dispersed in a solvent is dissolved into the solvent by heat of neutralization and/or heat of hydration generated in the neutralization process, and heat of polymerization generated in the polymerization process. In this manner, unlike the conventional method which first prepares a hydrophilic high-molecular-weight compound solution ("compound" of the present invention) and then adds the solution, the present invention allows to omit the extra step of preparing a hydrophilic high-molecular-weight compound solution before the process of producing the hydrophilic polymer (eg. water-absorbing resin). The present invention thus simplifies the production step of the hydrophilic polymer, and also reduces the production cost.

Further, for example, in the case of using starch, the conventional method requires a complicated process of heating up the dispersion solution to 60° C. or more so as to produce an α-starch before the dissolving process. On the other hand, the method of the present invention takes an easy step of dissolving the compound dispersed in a monomer solution into the solution by heat of polymerization, thereby evenly dissolving the compound into the solution. Therefore, even in mass production of water-absorbing resin, the manufacturing does not require a great burden of work for adjustment, or a large amount of hydrophilic polymer solution. On this account, the productivity of water-absorbing resin is ensured even in mass production.

Note that, "dissolve at least a part of the compound dispersed therein" indicates a process of dissolving 30 weight % or greater of the mixture amount (regarded 100%) of the compound at the time where the compound is mixed with the solvent. The dissolving amount is preferably 50 weight % or greater, more preferably 80 weight % or greater, most preferably 100 weight %.

Additional objects, features, and strengths of the present invention will be made clear by the description below. Further, the advantages of the present invention will be evident from the following explanation in reference to the drawings.

DESCRIPTION OF THE EMBODIMENTS

Figure 1:
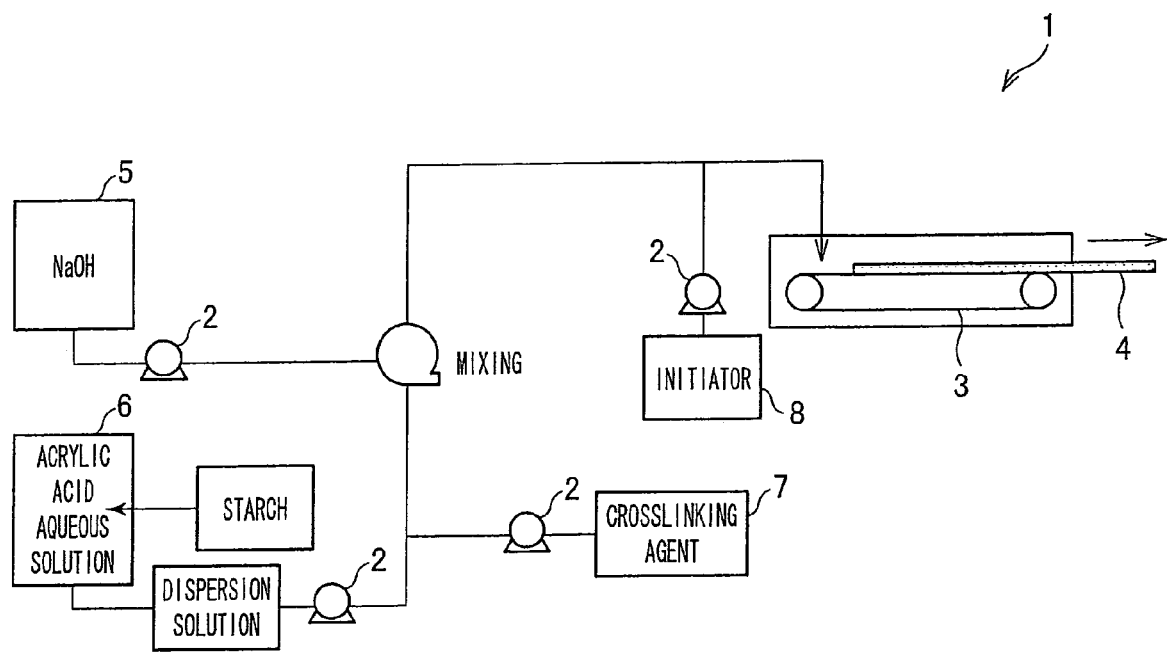
FIG. 1 is a schematic view showing a structure of a device for carrying out a production method for a water-absorbing resin according to one embodiment of the present invention.

The following will explain one embodiment of the present invention. However, the present invention is not limited to this.

In the following description, "weight" and "mass" are equivalent, and "weight %" and "mass %" are also equivalent. The term "main component" indicates a content of 50 mass % or greater. Moreover, the range "A to B" indicates a range not less than A but not more than B.

A production method according to one embodiment of the present invention is a method for producing a hydrophilic polymer by way of polymerization of a hydrophilic monomer in a solution, the method comprising the steps of: (1) mixing a solution containing a hydrophilic monomer and a compound which disperses in the solution, so as to prepare a dispersion solution of the compound; and (2) polymerizing the hydrophilic monomer in the solution, and heating the dispersion solution by heat of polymerization generated by the polymerization, so as to dissolve at least a part of the compound dispersed therein.

A production method according to another embodiment of the present invention is a method for producing a hydrophilic polymer by way of polymerization in a solution of a monomer containing an acid group, the method comprising the steps of: (a) mixing a solution containing a monomer containing an acid group and a compound which disperses in the solution, so as to prepare a dispersion solution of the compound; (b) mixing the dispersion solution with a neutralizing agent capable of neutralizing the monomer containing an acid group so as to neutralize the monomer containing an acid group; and heating the dispersion solution by heat of neutralization and/or heat of hydration generated by the neutralization, so as to dissolve at least a part of the compound dispersed therein; and (c) polymerizing the monomer containing an acid group in the dispersion solution having been neutralized in the step (b).

A production method according to still another embodiment of the present invention is a method for producing a hydrophilic polymer by way of polymerization in a solution of a monomer containing an acid group, the method comprising the steps of: (a) mixing a solution containing a monomer containing an acid group and a compound which disperses in the solution, so as to prepare a dispersion solution of the compound; (b) mixing the dispersion solution with a neutralizing agent capable of neutralizing the monomer containing an acid group so as to neutralize the monomer containing an acid group; and heating the dispersion solution by heat of neutralization and/or heat of hydration generated by the neutralization, so as to dissolve a part of the compound dispersed therein; and (c) polymerizing the monomer containing an acid group in the dispersion solution having been neutralized in the step (b), and dissolving at least a part of the compound dispersed in the dispersion solution having been neutralized by heat of polymerization generated by the polymerization.

Note that, among the foregoing embodiments, a preferred is the method comprising the steps of (b) heating the dispersion solution by heat of neutralization and/or heat of hydration generated by the neutralization, so as to dissolve a part of the compound dispersed therein; and (c) polymerizing the monomer containing an acid group in the dispersion solution having been neutralized in the step (b).

In the following description, a water-absorbing resin is used as one example of a hydrophilic polymer.

Examples of a monomer used in the present invention and to be the water-absorbing resin by polymerization are (i) an anionic unsaturated monomer and its salt, such as acrylic acid, methacrylic acid, maleic acid, maleic anhydride, β-acryloyloxypropionic acid, fumaric acid, crotonic acid, itaconic acid, cinnamic acid, vinyl sulfonic acid, allyltoluenesulfonic acid, vinyltoluenesulfonic acid, styrenesulfonic acid, 2-(meth)acrylamide-2-methylpropanesulfonic acid, 2-(meth)acryloylethanesulfonic acid, 2-(meth)acryloylpropanesulfonic acid, and 2-hydroxyethyl (meth)acryloylphosphate; (ii) a mercapto group-containing unsaturated monomer; (iii) a phenolic hydroxyl group-containing unsaturated monomer; (iv) an amide group-containing unsaturated monomer, such as (meth)acrylamide, N-ethyl (meth)acrylamide, and N,N-dimethyl (meth)acrylamide; and (v) an amino group-containing unsaturated monomer, such as N,N-dimethylaminoethyl (meth) acrylate, N,N-dimethylaminopropyl (meth)acrylate, and N, N-dimethylaminopropyl (meth)acrylamide. These monomers may be used alone or in combination of two or more. However, in light of the performance of the water-absorbing resin to be obtained and the cost, it is necessary to use, as the main component, acrylic acid and/or its salt (for example, salts of sodium, lithium, potassium, ammonium, amines, etc are preferable. Among these, sodium salt is especially preferable in light of the cost). Moreover, acrylic acid and/or its salt is preferably 50 mol % or more of the whole monomers, more preferably 65 mol % or more, further preferably 80 mol % or more, and especially preferably 95 mol % or more.

The concentration of the monomers in the solution (preferably an aqueous solution) is not especially limited, but is preferably 30 weight % or more, more preferably 30 weight % to 70 weight %, further preferably 35 weight % to 60 weight %, and especially preferably 40 weight % to 60 weight %. The productivity deteriorates when this concentration is less than 30 weight %, and the absorbency deteriorates when this concentration is more than 70 weight %.

The compound to be dissolved by the heat of polymerization and/or the heat of neutralization/the heat of hydration is a compound which is dispersible in an aqueous solution having a temperature of 0° C. to 40° C., specifically 10° C. to 30° C., and more specifically 25° C. (note that the pressure is a normal pressure (1 atmosphere pressure)) (in the present specification, this temperature range is referred to as "ordinary temperature"). Examples of such a compound are (i) starch; (ii) a starch derivative; (iii) a cellulose derivative, such as carboxymethylcellulose; (iv) polyvinyl alcohol and its partially saponified product; (v) a carboxyl group-containing polyvinyl alcohol; (vi) polyacrylic acid (salt) and its copolymer; (vii) polyacrylamide and its copolymer; (viii) acrylic acid (salt)-acrylamide copolymer; (ix) a copolymer of cationic monomer (such as N,N-dimethylaminoethyl (meth) acrylate and its quaternary salt) and polyacrylamide; (x) a hydrophilic high-molecular-weight compound (such as polyethylene (polypropylene) glycol and its terminal-modified product) which requires heating, cooling, and/or time for preparing its aqueous solution; (xi) mannitol whose solubility increases as the temperature increases (for example, its solubility with respect to water becomes twice as the temperature increases from 20° C. to 60° C.); (xii) highly crystalline reducing sugar, such as trehalose; and (xiii) highly crystalline nonreducing sugar. These compounds are usually solid powder compounds at ordinary temperature (Examples of such compounds include a compound disclosed in U.S. Pat. No. 4,693,713, and chelate compound powder disclosed in U.S. Pat. No. 6,599,989). Among these compounds, a preferable one is a compound, each particle of 90 weight % or more of which has a particle diameter of 5 mm or less. Moreover, the particle diameter is more preferably 5 μm to 3 mm, and especially preferably 10 μm to 1 mm. If the particle diameter is more than 5 mm, large undissolved substances may remain in the water-absorbing resin. Regarding the measurement of the particle size distribution (particle diameter distribution), particles each having a diameter of about 38 μm to 5 mm can be measured by using known sieve screen (JIS Z 8801-1: 2000) and a screening tester of, for example, tap-type, whereas particles each having a diameter of less than 38 μm can be measured by using, for example, a laser diffraction-type particle diameter distribution measuring device. In the following description, these compounds are collectively called "hydrophilic compound".

Specifically, the hydrophilic compound has a solubility of preferably 2 g or more with respect to 100 g of water having a temperature of 60° C. at normal pressure, more preferably 5 g or more, further preferably 10 g or more, yet further preferably 30 g or more, and especially preferably 50 g or more.

Moreover, further examples of the hydrophilic compound are a hydrophobic monomer and a hydrophobic surfactant (for example, trimethylolpropane, zinc laurate, zinc oleate, erucic acid amide, and oleic amide) which disperses in a hydrophilic monomer solution to be used for polymerization, but dissolves when the temperature increases or dissolves by melting when the temperature increases.

Moreover, the concentration of the hydrophilic compound with respect to the monomer is not especially limited, and is set accordingly depending on target performances. However, this concentration is preferably 0.1 weight % or more, more preferably 1 weight % or more and further preferably 2 weight % or more, and preferably 50 weight % or less, more preferably 40 weight % or less and further preferably 30 weight % or less. When this concentration is less than 0.1 weight %, the addition of the hydrophilic compound produces substantially no effect. When this concentration is more than 50 weight %, the absorbency may deteriorate. The concentration of the hydrophilic compound with respect to the monomer aqueous solution is not especially limited except for a case where undissolved residues become problematic. However, this concentration is preferably 50 weight % or less. The amount of the hydrophilic compound dispersed in the monomer aqueous solution is not especially limited except for a case where undissolved residues become problematic. However, this amount is preferably 50 weight % or less with respect to the monomer aqueous solution (100%), and more preferably 30 weight %.

According to the production method of the present invention, it is possible to prepare a dispersion solution by adding (mixing) the hydrophilic compound in liquid in which the hydrophilic compound does not dissolve or in an aqueous solution whose temperature is such that most of the hydrophilic compound does not dissolve, so as to easily disperse the hydrophilic compound without producing "fish eyes" (preparing step). A method for dispersing the hydrophilic compound is not especially limited. However, it is possible to use, for example, a method for dispersing the hydrophilic compound by putting it in a liquid monomer in a tank or by putting it in the monomer aqueous solution, or a method for consecutively dispersing, by a mixer, the hydrophilic compound in the liquid flowing consecutively. In the case of dispersing the hydrophilic compound in the tank, it is preferable to stir the liquid so that dispersed particles are not deposited. By dispersing the hydrophilic compound in this manner, it is possible to uniformly dissolve the hydrophilic compound in the monomer aqueous solution when the heat of polymerization, and/or the heat of neutralization and/or the heat of hydration is (are) generated.

Note that in addition to the hydrophilic compound, the aqueous solution containing the hydrophilic monomer contains other additives, such as an unsaturated monomer component (internal crosslinking agent (will be described later)) and a polymerization initiator.

When the hydrophilic monomer is an acid group-containing monomer, it is necessary to neutralize the acid group-containing monomer. When neutralizing the acid group-containing monomer (neutralizing step), the neutralization ratio is not especially limited. However, since the neutralization after the polymerization is not required in an application in which an end product such as sanitary goods may touch human body, the neutralization ratio is preferably 50 mol % or more. Moreover, the neutralization ratio is more preferably 50 mol % or more but less than 85 mol %, further preferably 55 mol % to 80 mol %, and most preferably 60 mol % to 75 mol %. A known basic substance, such as carbonate (bicarbonate), alkali metal hydroxide, ammonia, or organic amine, is used for the neutralization.

The heat of neutralization and/or the heat of hydration is generated by such a neutralizing step, and the temperature of the monomer aqueous solution becomes preferably 60° C. or more, more preferably 70° C. or more, further preferably 80° C. or more, and especially preferably 90° C. or more. The temperature of less than 60° C. is not preferable since the hydrophilic compound is not dissolved sufficiently. Note that the temperature is measured by using a generally used mercury thermometer, spirit thermometer, platinum thermal resistance, contact-type temperature sensor such as a thermocouple or a thermistor, or radiation thermometer.

According to the production method of the present invention, when the monomer aqueous solution cannot be sufficiently increased in temperature by the heat of neutralization and/or the heat of hydration, the hydrophilic compound may be dissolved only by the heat of polymerization (will be described later). However, when the monomer aqueous solution can be sufficiently increased in temperature by the heat of neutralization and/or the heat of hydration, that is, when the monomer aqueous solution can be sufficiently increased in temperature by the heat of neutralization and/or the heat of hydration so that the hydrophilic compound can be dissolved, the hydrophilic compound can be dissolved by the heat of neutralization and/or the heat of hydration. Moreover, when the heat of neutralization and/or the heat of hydration is used for dissolving the hydrophilic compound, the whole hydrophilic compound dispersed may be dissolved by the heat of neutralization and/or the heat of hydration, or part of the hydrophilic compound dispersed may be dissolved by the heat of neutralization and/or the heat of hydration. When dissolving part of the hydrophilic compound, the percentage of the hydrophilic compound dissolved in the aqueous solution in the neutralizing step is preferably 30 weight % or more of the total amount (100%) of the hydrophilic compound mixed, more preferably 50 weight % or more, and further preferably 80 weight % or more. When a graft polymer is targeted, less than 30 weight % may not be enough to obtain a significant grafted product.

Note that the generation of the heat of neutralization and/or the heat of hydration is preferably used for not only the temperature increase of the monomer aqueous solution and the dissolution of the hydrophilic compound but also the removal of the dissolved oxygen.

In order to effectively use the heat of neutralization and/or the heat of hydration as above, it is preferable to carry out the neutralization in an adiabatic state, and it is more preferable to carry out the neutralization consecutively and also carry out the polymerization consecutively. Therefore, for example, it is desirable to use a container which can suppress heat radiation as much as possible. Regarding the material of the container, it is preferable to use, for example, a container configured such that a noncontact member made of resin, rubber or stainless steel is covered with a heat insulating material.

In the present invention, a method for obtaining the water-absorbing resin having a crosslinked structure is to add a crosslinking agent to a monomer, so as to polymerize the monomer. Moreover, when carrying out this method, it may be possible to carry out a known crosslinking method for obtaining the water-absorbing resin, such as radical self cross-linking or radiation cross-linking during the polymerization.

The internal crosslinking agent used here is not limited as long as it can form the crosslinked structure during the polymerization. Examples of the internal crosslinking agent are (i) a crosslinking agent having a plurality of polymerizable unsaturated groups, (ii) a crosslinking agent, such as glycidyl acrylate, having a polymerizable unsaturated group and a highly reactive group, (iii) a crosslinking agent, such as (poly) ethylene glycol diglycidyl ether, having a plurality of highly reactive groups, and (iv) an ionic crosslinking agent, such as polyvalent metal salt (for example, aluminum chloride). These may be used in combination. However, it is most preferable to use the crosslinking agent having a plurality of polymerizable unsaturated groups in light of physical properties. For example, the crosslinking agent, used here, having a plurality of polymerizable unsaturated groups is one or two or more of N,N'-methylene bisacrylamide, (poly)ethylene glycol di(meth)acrylate, (poly)propylene glycol di(meth) acrylate, trimethylolpropane tri(meth)acrylate, trimethylolpropane di(meth)acrylate, trimethylolpropane tri($\beta$-acryloyloxypropionate), polyethylene glycol di($\beta$-acryloyloxypropionate), (meth)allyloxyalkane, and glycerin acrylate methacrylate. Note that the amount of the crosslinking agent used is determined accordingly depending on the type of the crosslinking agent and the target water-absorbing resin. However, this amount is usually 0.005 mol % to 10 mol % with respect to the acid group-containing polymerizable monomer, preferably 0.01 mol % to 1 mol %, and more preferably 0.05 mol % to 0.5 mol %.

A method for polymerizing the monomer is not especially limited as long as it is aqueous polymerization. The present invention can be carried out by, for example, stationary polymerization of polymerizing the monomer aqueous solution in a stationary state, or stirring polymerization of polymerizing the monomer aqueous solution in a stirrer (polymerizing step).

Note that in the polymerization, 1 weight % or less of a chain transfer agent (for example, hypophosphorous acid (salt)) or a chelating agent may be added.

In the stationary polymerization, it is preferable to use an endless belt. Moreover, it is preferable that the belt be made of resin or rubber so that the heat of polymerization does not easily radiate from a contact surface thereof.

In the stirring polymerization, it is possible to use a stirrer having one stirring bar, however it is preferable to use a stirrer having a plurality of stirring bars.

Generally, in radical aqueous polymerization, before putting the polymerization initiator, dissolved oxygen which disturbs the polymerization is removed by blowing inactive gas or by degassing under reduced pressure. This requires equipments and operating cost. According to a preferable embodiment of the present invention, the removal of dissolved oxygen is carried out by utilizing the heat of neutralization and/or the heat of hydration, increasing the temperature of the monomer aqueous solution, and volatilizing dissolved oxygen.

According to a more preferable embodiment of the present invention, acrylic acid, alkali aqueous solution, water, etc. which are raw materials of the monomer aqueous solution are increased in temperature by the neutralization without deoxidizing in advance. Thus, the amount of dissolved oxygen is adjusted so as to be preferably 4 ppm or less with respect to the monomer aqueous solution, more preferably 2 ppm or less, and most preferably 1 ppm or less. In this way, the polymerization of this monomer aqueous solution can be carried out without a deoxidizing operation. The amount of dissolved oxygen can be measured by, for example, a measuring device (UD-1 DO Meter produced by Central Kagaku Corporation). The prepared monomer aqueous solution is iced while being moderately stirred under a nitrogen atmosphere so that bubbles are not formed. Then, the amount of dissolved oxygen is measured when the temperature of the solution is 50° C.

Moreover, it is also preferable that part or all of acrylic acid, alkali aqueous solution, water, etc. which are raw materials of the monomer aqueous solution be partially deoxidized in advance and be further deoxidized by the heat of neutralization. Moreover, when (i) acrylic acid and alkali are neutralized by line mixing, (ii) the polymerization initiator is subjected to line mixing, and (iii) the polymerization is started at 80° C. or higher, it is preferable that acrylic acid, alkali aqueous solution, water, etc. be hardly deoxidized or not deoxidized at all so that the starting of the polymerization during the line is prevented.

The polymerization is usually carried out at normal pressure. However, it is also preferable that the polymerization be carried out at reduced pressure while causing water to evaporate so that the boiling temperature of the polymerization system is lowered. To facilitate operations, it is more preferable to carry out the polymerization at normal pressure. Note that when the polymerization system boils, the neutralization ratio of the polymer obtained by vaporizing acrylic acid may exceed the neutralization ratio set for the monomer aquebus solution.

Examples of the polymerization initiator used in the present invention are not especially limited, and are (i) a thermally decomposable initiator (for example, persulfate (sodium persulfate, potassium persulfate, ammonium persulfate), peroxide (hydrogen peroxide, t-butyl peroxide, methyl ethyl ketone peroxide), azo compound (azo nitryl compound, azo amidine compound, cyclic azo amidine compound, azo amide compound, alkyl azo compound, 2,2'-azobis(2-amidinopropane)dihydrochloride, 2,2'-azobis[2-(2-imidazoline-2-yl)propane]dihydrochloride) and (ii) an optically decomposable initiator (for example, benzoin derivative, benzil derivative, acetophenone derivative, benzophenone derivative, azo compound). In light of the cost and its performance of reducing the residual monomers, persulfate is preferable.

Moreover, it is also preferable to use the optically decomposable initiator and ultraviolet. It is more preferable to use both the optically decomposable initiator and the thermally decomposable initiator.

It is preferable that the temperature of the monomer be set to be high in advance. This is because, as described above, the removal of dissolved oxygen becomes easy. Moreover, according to the production method of the present invention, the hydrophilic compound dispersed in the monomer aqueous solution may be dissolved by utilizing the heat of neutralization and/or the heat of hydration. Therefore, since the temperature of the monomer before the polymerization is high, it is possible to dissolve the hydrophilic compound dispersed. Moreover, a preferable temperature, described below, for starting the polymerization can be realized at once. Thus, the temperature of starting the polymerization is usually 50° C. or more, preferably 60° C. or more, more preferably 70° C. or more, further preferably 80° C. or more, yet further preferably 90° C. or more, still further preferably 80° C. to 105° C., and most preferably 90° C. to 100° C. When this polymerization starting temperature is less than 50° C., the productivity deteriorates due to the extension of induction period and the polymerization period, and the physical properties of the water-absorbing resin also deteriorates. The polymerization starting temperature can be observed by the whitish monomer aqueous solution, viscosity rise, temperature rise, etc.

In the production method of the present invention, the hydrophilic compound may be dissolved by utilizing the heat of neutralization and/or the heat of hydration. Instead, the hydrophilic compound may be dissolved by the heat generated by the polymerization. Note that in the production method of the present invention, at least part of the hydrophilic compound may be dissolved by utilizing the heat of polymerization in addition to the heat of neutralization and/or the heat of hydration. Note that "at least part of" used here means that (i) the amount of the compound dispersing is 70% or less of the total amount (100%) of the compound mixed with the aqueous solution, preferably 50% or less, and more preferably 20% or less, or (ii) the compound is dissolved completely.

In the production method of the present invention, in order to dissolve the hydrophilic compound by utilizing the heat of polymerization, a maximum end-point temperature during the polymerization is not especially limited, but is preferably 150° C. or less, more preferably 140° C. or less, further preferably 130° C. or less, yet further preferably 120° C. or less, and especially preferably 115° C. or less. It is not preferable that the maximum temperature exceed 150° C. since the properties of the polymer (hydrated polymer, base polymer, water-absorbing resin) to be obtained deteriorate significantly.

Note that the temperature of the polymerization system can be measured by using a PC card type data collection system "NR-1000" produced by Keyence Corporation. Specifically, a thermocouple is placed at the center of the polymerization system, and the measurement is carried out with a sampling cycle of 0.1 second. The polymerization starting temperature and a peak temperature (maximum end-point temperature) are read from a Temperature-Time chart thus obtained.

Moreover, in the present invention, a difference ΔT between the polymerization starting temperature and the maximum end-point temperature during the polymerization is preferably 70° C. or less, more preferably 60° C. or less, further preferably 50° C. or less, yet further preferably 40° C. or less, still further preferably 30° C. or less, and most preferably 25° C. or less. It is not preferable that the temperature difference ΔT be more than 70° C. since the physical properties of the polymer (hydrated polymer, base polymer, and water-absorbing resin) to be obtained deteriorate.

In order to obtain the heat of polymerization which heat is such that the temperature during the polymerization becomes the above temperature, the concentration of the monomer is more preferably 30 weight % or more.

The polymerization period is not especially limited, but is preferably 5 minutes or less, more preferably 3 minutes or less, further preferably less than 3 minutes, yet further preferably 2 minutes or less, and especially preferably 1 minute or less. It is not preferable that the polymerization period exceed 5 minutes since the productivity of the polymer (hydrated polymer, base polymer, and water-absorbing resin) to be obtained deteriorates.

Here, the polymerization period is obtained by counting time from (i) when the monomer aqueous solution is put in a polymerization container and conditions for starting the polymerization are set (in the case of using the optically decomposable initiator, when light irradiation is started/in the case of not using the optically decomposable initiator, when the monomer aqueous solution and the polymerization initiator are put in the polymerization container) to (ii) when the peak temperature is reached. That is, the polymerization period can be obtained by adding the induction period to the time from when the polymerization is started to when the peak temperature is reached.

According to a preferable example of the polymerization method of the present invention, after the polymerization is started, the polymerization proceeds while (i) the temperature of the system increases rapidly and reaches the boiling point when a polymerization ratio is low (for example, when the polymerization ratio is 10 mol % to 20 mol % of the whole monomers (100 mol %), (ii) the system produces water vapor, and (iii) the concentration of solid content is increased. Thus, the concentration of solid content is increased by effectively utilizing the heat of polymerization. Therefore, it is desirable to suppress the heat radiation from a contact member of the polymerization container as much as possible. Regarding the material of the container, it is preferable to use, for example, a container configured such that a noncontact member made of resin, rubber or stainless steel is covered with a heat insulating material or is heated by a jacket. The water vapor produced from the system may contain the monomers. In such a case, it is preferable to collect and reuse those monomers. It is especially preferable to collect acrylic acid and/or water evaporated during the polymerization, and reuse them. The amount of acrylic acid collected is preferably 1% or more of the amount of the whole acrylic acid (before the neutralization), more preferably 2% or more, and further preferably 3% or more.

The concentration of solid content in the hydrated polymer is obtained in the following manner: (i) part of (small amount of) the hydrated polymer taken out of the polymerizatioin container is cut off, (ii) the cut hydrated polymer is cooled down, (iii) the cooled hydrated polymer is cut into pieces with scissors, (iv) 5 g of the hydrated polymer is put in a dish, (v) the hydrated polymer is dried in a drier of 180° C. for 24 hours, and (vi) the concentration is finally measured. The concentration of solid content in a particulate hydrated polymer can be obtained in the following manner: (i) 5 g of a sample is put in a dish, (ii) the sample is dried in a drier of 180° C. for 24 hours, and (iii) the concentration is finally calculated from loss on drying.

Moreover, in order to produce high-performance water-absorbing resin, the polymerization at normal pressure in the method of the present invention is preferably such that the temperature is 100° C. or more when the polymerization ratio is 40 mol % and the temperature is also 100° C. or more when the polymerization ratio is 50 mol %. The polymerization is more preferably such that the temperature is 100° C. or more when the polymerization ratio is 30 mol % and the temperature is also 100° C. or more when the polymerization ratio is 50 mol %. The polymerization is most preferably such that the temperature is 100° C. or more when the polymerization ratio is 20 mol % and the temperature is also 100° C. or more when the polymerization ratio is 50 mol %. In the case of the polymerization under reduced pressure, it is preferable that the temperature reaches the boiling temperature when the polymerization ratio is 40 mol % and the temperature also reaches the boiling temperature when the polymerization ratio is 50 mol %. It is more preferable that the temperature reaches the boiling temperature when the polymerization ratio is 30 mol % and the temperature also reaches the boiling temperature when the polymerization ratio is 50 mol %. It is most preferable that the temperature reaches the boiling temperature when the polymerization ratio is 20 mol % and the temperature also reaches the boiling temperature when the polymerization ratio is 50 mol %.

As above, since the temperature becomes high when the polymerization ratio is low, the time required for the polymerization is short and is usually 10 minutes or less. Note that the time required for the polymerization indicates a time from when the monomer aqueous solution mixed with the polymerization initiator is put in the polymerization container to when the hydrated polymer is taken out of the polymerization container.

The production method of the present invention can be carried out by using a consecutively producing apparatus 1 shown in, for example, FIG. 1. This apparatus includes a container 5 containing a sodium hydroxide aqueous solution, a container 6 containing an acrylic acid aqueous solution, a container 7 containing the crosslinking agent, a container 8 containing the polymerization initiator, pumps 2 which adjust the flow of the solution (agent) from these containers 5 to 8, and a belt conveyor 3. On the conveyor belt 3 is hydrated polymer 4 which is formed by polymerizing the monomer aqueous solutions flown from the containers 5 to 8 and mixed with each other. When the hydrophilic compound is starch, it is preferable to disperse the starch in the acrylic acid aqueous solution in the container 6 by stirring so that the starch is not deposited in the container 6. Thus, the starch disperses easily, and can be dissolved by effectively utilizing the heat of neutralization and/or the heat of dissolution.

After the above hydrated polymer is broken into pieces, these pieces are dried and further crushed. Thus, a base polymer (water-absorbing resin not subjected to the surface treatment) can be obtained.

In the production method of the present invention, the base polymer may be subjected to a surface crosslinking treatment. With this, it is possible to obtain the water-absorbing resin having comparatively high absorbency under load, such as 1.9 kPa (about 0.3 psi) or 4.8 kPa (about 0.7 psi).

A preferably used surface crosslinking agent is a crosslinking agent which can react with an acid group, and examples thereof are: a polyhydric alcohol compound, such as (poly) propylene glycol, (poly)ethylene glycol, (poly)glycerin, 1,3-propanediol, and 1,4-butanediol; a polyvalent epoxy compound, such as (poly)ethylene glycol diglycidyl ether; a polyvalent amine compound, such as (poly)ethyleneimine; various alkylene carbonate compounds, such as 1,3-dioxolane-2-one, 4-methyl- 1,3-dioxolane-2-one, and 4,6-dimethyl-1,3-dioxane-2-one; polyvalent metal salt, such as aluminum salt; a polyvalent aldehyde compound; a polyvalent isocyanate compound; a polyvalent oxazoline compound; an oxazolidinone compound; an oxetane compound; a haloepoxy compound; a polyvalent aziridine compound; and a compound having polyvalent metal salt (such as aluminum chloride and aluminium sulfate) and a functional group thereof.

These surface crosslinking agents may be used alone or in combination of two or more. Note that the amount of the surface crosslinking agent used is in a range from 0.001 weight % to 10 weight % with respect to the weight of the water-absorbing resin, and more preferably in a range from 0.01 weight % to 5 weight %.

A method for adding the surface crosslinking agent is not especially limited, and examples thereof are a mixing method by dissolving the crosslinking agent in hydrophilic solvent or hydrophobic solvent, a mixing method without solvents, etc. Among these, it is preferable to use, as the hydrophilic solvent, water or a mixture containing water and a water-soluble organic solvent. Although the amount of the hydrophilic solvent used or the amount of the mixture used depends on, for example, a combination of the water-absorbing resin and the crosslinking agent, it may be in a range from 0 weight % to 50 weight % with respect to the water-absorbing resin (100%), and preferably in a range from 0.5 weight % to 30 weight %. When mixing, the surface crosslinking agent or its solution can be mixed by dropping or spraying.

Examples of a mixer used for mixing the water-absorbing resin and the solution containing the crosslinking agent are preferably a cylindrical mixer, a double wall cone mixer, a high-speed stirring mixer, a V-shaped mixer, a ribbon mixer, a screw mixer, a flow type furnace rotary disc mixer, an air flow mixer, a double arm kneader, an internal mixer, a crush kneader, and a rotary mixer.

In order to increase the crosslink density of the surface of the water-absorbing resin, heating is carried out after the addition of the surface crosslinking agent. The heating temperature may be selected accordingly depending on a desired crosslink density, etc., but is usually in a range from 100° C. to 250° C., and more preferably in a range from 150° C. to 250° C. Moreover, the heating time may be selected accordingly depending on the heating temperature, but is preferably in a range from 1 minute to 2 hours.

Note that the present specification uses the terms "hydrated polymer", "base polymer", "surface crosslinked water-absorbing resin", and each of these terms are one form of the water-absorbing resin.

When the hydrated polymer formed by the aqueous polymerization from the monomer component which becomes the water-absorbing resin by polymerization is in such a shape that it is difficult to be dried, such as a thick plate shape, a block shape, a sheet shape, etc., the hydrated polymer is first crushed, and then dried, further crushed, classified, surface-treated, etc. Thus, a water-absorbing resin product is obtained. In the case of acrylic acid (acrylate) based water-absorbing resin, when the concentration of solid content in the hydrated polymer is less than 55 weight %, the acrylic acid (acrylate) based water-absorbing resin can be crushed easily by a meat chopper extruder, etc. Moreover, when the concentration of solid content is more than 82 weight %, the acrylic acid (acrylate) based water-absorbing resin can be easily crushed by a normal impact type crusher, etc., as with the dried hydrated polymer. However, it is preferable that the hydrated polymer having the concentration of solid content of from 55 weight % to 82 weight % be crushed by a device corresponding to a shearing type primary crusher or a cutting/shearing mill shown in a classification of crushers in Table 16.4 of Kagaku Kogaku Binran (Handbook of Chemical Engineering (in Japanese), 6th edition, The Society of Chemical Engineers, Japan, Maruzen Co., Ltd., 1999). Further, it is preferable to use a device which carries out crushing by the shearing of a stationary blade and a rotary blade.

Moreover, when crushing, an anionic surfactant such as polyoxyethylene alkyl ether sodium sulfate, a nonionic surfactant such as polyoxyethylene sorbitan fatty acid ester, a cationic surfactant, and an ampholytic surfactant can be used.

The weight average particle diameter of the particulate hydrated polymer obtained by crushing is usually in a range from about 1 mm to 10 mm.

In the production method of the present invention, the crushed hydrated polymer may be dried. The drying method is not especially limited, but is preferably a drying method for causing materials to contact hot air or a heating surface while causing the materials to move, such as a stirring/drying method, a fluidized bed drying method, and an air flow drying method. The drying temperature may be set accordingly depending on the characteristics of the hydrated polymer.

In the production method of the present invention, how to treat the crushed hydrated polymer (particulate hydrated polymer) thereafter can be selected from the following methods (a) to (f).

(a) Commercialize the particulate hydrated polymer as-is. The particulate hydrated polymer is used as-is for sanitary goods, agriculture, horticulture, etc. For the flowability of the particles, particulate inorganic substances (bentonite, zeolite, silicon oxide, etc.) may be mixed.

(b) Mix the surface crosslinking agent with the particulate hydrated polymer so as to cause the surface crosslinking agent to react with the particulate hydrated polymer, and commercialize the particulate hydrated polymer. This method does not require energy for vaporizing water. For the flowability of the particles, particulate inorganic substances (bentonite, zeolite, silicon oxide, etc.) may be mixed.

(c) Mix the surface crosslinking agent with the particulate hydrated polymer so as to cause the surface crosslinking agent to react with the particulate hydrated polymer, and after drying, commercialize the dried particulate polymer. The energy of the surface crosslinking reaction can be used as heating energy for drying.

(d) Dry the particulate hydrated polymer, commercialize the dried particulate polymer.

(e) Dry the particulate hydrated polymer, crush the dried particulate polymer, classify the crushed particulate polymer, and commercialize the classified particulate polymer.

(f) Dry the particulate hydrated polymer, crush the dried particulate polymer, classify the crushed particulate polymer, surface-crosslink the classified particulate polymer, and commercialize the surface-crosslinked particulate polymer.

As above, in the production method of the present invention, the hydrophilic compound is dispersed in the monomer aqueous solution, and the hydrophilic compound is dissolved by any one of (1) the heat of neutralization and/or the heat of hydration, (2) the heat of polymerization, and (3) the heat of neutralization and/or the heat of hydration, and the heat of polymerization. In production methods of conventional technologies, a solution of the hydrophilic compound is prepared in advance, and this solution is added to the monomer aqueous solution. In this case, there is a problem in that when realizing the mass production of the water-absorbing resin, the amount of the hydrophilic resin solution also increases. Moreover, when the starch is used as the hydrophilic compound, the preparation becomes complex (the dispersion aqueous solution needs to be increased in temperature so as to be about 60° C. or higher). Since a complex adjustment operation is required, this disturbs the productivity increase. According to the method of the present invention, all of these problems can be solved, producing steps can be simplified, the cost can be reduced, and the productivity can be improved even when producing a large amount of hydrophilic polymer. Moreover, according to the method of the present invention, since the hydrophilic compound is dissolved after it is dispersed in the monomer aqueous solution, the hydrophilic compound can be dissolved uniformly in the aqueous solution, and excellent water-absorbing resin can be produced.

Note that the method of the present invention is not limited to the production method of the water-absorbing resin explained above. The production method of the present invention is applicable as long as the hydrophilic polymer is polyacrylic acid (polyacrylate) based resin or polyacrylamide based resin (water soluble resin) (weight average molecular weight is preferably from 100 to 1 million, and more preferably 1,000 to 1 million).

As described, a production method according to one embodiment of the present invention is a method for producing a hydrophilic polymer by way of polymerization of a hydrophilic monomer in a solution, the method comprising the steps of: (1) mixing a solution containing a hydrophilic monomer and a compound which disperses in the solution, so as to prepare a dispersion solution of the compound; and (2) polymerizing the hydrophilic monomer in the solution, and heating the dispersion solution by heat of polymerization generated by the polymerization, so as to dissolve at least a part of the compound dispersed therein.

Moreover, in a method for producing the hydrophilic polymer of the present invention, it is preferable that the hydrophilic monomer be an acid group-containing monomer.

As described, a production method according to another embodiment of the present invention is a method for producing a hydrophilic polymer by way of polymerization in a solution of a monomer containing an acid group, the method comprising the steps of: (a) mixing a solution containing a monomer containing an acid group and a compound which disperses in the solution, so as to prepare a dispersion solution of the compound; (b) mixing the dispersion solution with a neutralizing agent capable of neutralizing the monomer containing an acid group so as to neutralize the monomer containing an acid group; and heating the dispersion solution by heat of neutralization and/or heat of hydration generated by the neutralization, so as to dissolve at least a part of the compound dispersed therein; and (c) polymerizing the monomer containing an acid group in the dispersion solution having been neutralized in the step (b).

As described, a production method according to still another embodiment of the present invention is a method for producing a hydrophilic polymer by way of polymerization in a solution of a monomer containing an acid group, the method comprising the steps of: (a) mixing a solution containing a monomer containing an acid group and a compound which disperses in the solution, so as to prepare a dispersion solution of the compound; (b) mixing the dispersion solution with a neutralizing agent capable of neutralizing the monomer containing an acid group so as to neutralize the monomer containing an acid group; and heating the dispersion solution by heat of neutralization and/or heat of hydration generated by the neutralization, so as to dissolve a part of the compound dispersed therein; and (c) polymerizing the monomer containing an acid group in the dispersion solution having been neutralized in the step (b), and dissolving at least a part of the compound dispersed in the dispersion solution having been neutralized by heat of polymerization generated by the polymerization.

As compared with conventional production methods, the method for producing the hydrophilic polymer of the present invention can improve the productivity and produce high-performance water-absorbing resin (hydrophilic polymer).

Moreover, in the method for producing the hydrophilic polymer of the present invention, it is preferable that in the neutralizing step, the neutralization be continued until the neutralization ratio becomes 50 mol % to 85 mol %. Thus, the heat of neutralization which can dissolve the compound sufficiently is easily obtainable.

Moreover, in the method for producing the hydrophilic polymer of the present invention, it is preferable that the maximum temperature of the heat of polymerization be at least 100° C.

Thus, it is possible to further satisfactorily dissolve the compound dispersed in the aqueous solution.

Moreover, in the method for producing the hydrophilic polymer of the present invention, it is preferable that 50% or more of a component contained as the acid group-containing monomer be acrylic acid and/or acrylate.

Moreover, in the method for producing the hydrophilic polymer of the present invention, it is preferable that the hydrophilic polymer be a water-soluble polymer and/or water-absorbing resin.

Moreover, in the method for producing the hydrophilic polymer of the present invention, a powder compound which is solid at ordinary temperature can be used as the above compound.

Moreover, in the method for producing the hydrophilic polymer of the present invention, it is preferable that 90 weight % or more of particles of the powder compound which is solid at ordinary temperature are 5 mm or less in diameter.

Moreover, in the method for producing the hydrophilic polymer of the present invention, it is preferable that solubility of the powder compound which is solid at ordinary temperature is 2 g or more in 100 g of water of 60° C.

Moreover, in the method for producing the hydrophilic polymer of the present invention, it is preferable that the powder compound which is solid at ordinary temperature be a hydrophilic high-molecular-weight compound.

The manufacturing method of hydrophilic polymer according to the present invention is useful for production of water-absorbent resin. In this case, the shape of the water-absorbent resin is not limited, and may be particles or powder which are spherical or irregularly-pulverized, a gel, a sheet, a bar, fiber, or a film.

Further, the water-absorbing resin may be combined with a fiber material or the like or may be held by it; however, particles or powder form is more preferable in consideration of general usage of the water-absorbing resin, which is an absorptive article, plant or afforestation.

The water-absorbing resin particles or powder are generally 10 to 2000 μm in mass average particle diameter before or after crosslinking. To ensure superior property, the mass average particle diameter may be adjusted in a range of 100 to 1000 μm, more preferably 200 to 600 μm, particularly preferably 300 to 500 μm. In this point of view, the content of the water-absorbing resin 150 to 850 μm in particle diameter is 90 to 100 weight %, more preferably 95 to 100 weight %, particularly preferably 98 to 100 weight %.

Further, for the water-absorbing resin, the absorption against pressure (4.8 kPa) with respect to physiological saline solution is preferably not less than 15 g/g, more preferably 20 g/g, particularly preferably 23 g/g, most preferably 25 g/g. Further, the absorption against pressure (1.9 kPa) with respect to physiological saline solution is generally 15 g/g, preferably 20 g/g, more preferably 25 g/g, further preferably 28 g/g, particularly preferably 32 g/g. Further, absorption ratio under no pressure is preferably 25 g/g, more preferably 28 g/g, particularly preferably 32 g/g.

If the absorption ratio against pressure or under no pressure falls outside the range, for example, in the case of processing the water-absorbing resin into paper diaper or the like, it may cause leakage of liquid, and the absorption property of the absorptive article decreases. This is not preferable. The upper limit of the absorption ratio against pressure or under no pressure is not particularly limited, but is generally adjusted to 60 g/g to ensure a good balance with other properties and also in terms of cost.

The production method of the present invention produces a superior water-absorbent resin ensuring a desirable balance of the absorption ratio (absorption ratio under no pressure), the absorption ratio (AAP (Absorbency Against Pressure)), and the soluble content. The water-absorbing resin there has a desirable property. The water-absorbing resin is therefore useful for agriculture/gardening water-retaining agent, industrial water-retaining agent, moisture-absorbing agent, dehumidification agent, building material or the like, particularly for paper diaper, incontinent pad, mother's milk pad, or sanitary napkin.

Further, the water-absorbing resin ensures good property balance, and therefore preferably used for sanitary products (eg. paper diaper) which contains a large quantity of the water-absorbing resin relative to the base fiber material. More specifically, the concentration of the water-absorbing resin is preferably in a range of 30 to 100 weight %, more preferably 40 to 100 weight %, further preferably 50 to 95 weight %.

EXAMPLES

The present invention is more specifically explained below with some concrete examples. The present invention is however not limited to those examples. Note that, unless otherwise specified, "part(s)" indicates "part(s) by weight" or a part (s) by mass". The water absorbent resin is used under condition of 25° C.±2° C. and about 50%±5% RH (relative humidity). Also, a 0.90 weight % chloride sodium aqueous solution was used as a physiological saline solution.

<Absorption Ratio>

0.20 g of water absorbing resin was contained in a bag (60 mm×85 mm) made of a nonwoven fabric. Then, the bag was soaked in physiological saline solution whose temperature had been adjusted to 25° C.±2° C., and was withdrawn 30 minutes later. By using a centrifugal separator (provided by KOKUSAN Co.Ltd., H-122 type small centrifugal separator) the bag was drained for three minutes at 250G (250×9.81 m/s$^2$), and a weight W2 (g) of the bag was measured. Next, the same operation was performed without using the water-absorbent resin, and a weight W1 (g) was measured. Then, from the weights W2 and W1, an absorption ratio (g/g) was calculated according to the following equation.

Absorption ratio $(g/g)=((W2(g)-W1(g))$/weight $(g)$ of the water-absorbing resin−1 (1)

[Soluble Amount (Amount of Water-soluble Component)]

184.3 g of a physiological saline solution was taken into a 250 ml plastic container having a lid. Into the solution, 1.00 g of water-absorbing resin was added, and the solution was stirred for 16 hours, thereby extracting a soluble content from the resin. The extract solution was filtered through a piece of filter paper (No. 2), thereby obtaining a filtrate. 50.0 g of the filtrate was measured so as to be used as a measurement solution.

First, only the physiological saline solution was titrated by using a 0.1 N NaOH solution, until pH of the physiological saline solution reached 10. Thereafter, the physiological saline solution was titrated by using a 0.1 N HCl solution, until pH of the physiological saline reached 2.7. In this way, blank titration amounts ([bNaOH]ml and [bHCl]ml) were measured. The same operation was performed with respect to the measurement solution, thereby measuring titration amounts ([NaOH]ml and [HCl]ml). For example, in the case of a water-absorbent resin obtained through polymerization of a known amount of acrylic acid and its salt, an amount of soluble content (mainly made of the extracted water-soluble polymer) in the water-absorbent resin was calculated, in accordance with the following equation (2), from an average molecular mass of the monomer and the titration amounts obtained by the foregoing operation. Note that, in the case where the content is unknown, the average molecular mass of the monomer can be found in accordance with a neutralization ratio (Equation (3)) which is found by titration.

Amount of soluble content (wt %)=0.1×(average molecular mass)×184.3×100×([HCl]−[$b$HCl])/1000/1.0/50.0  (2)

Neutralization ratio (mol %)=(1−([NaOH]−[$b$NaOH])/([HCl]/[$b$HCl]))×100  (3)

<Absorption Against Pressure (AAP): Absorption Ratio for 0.9 Weight % Sodium Chloride Aqueous Solution Under Pressure of 4.8 kPa>

A stainless gauze of 400 meshes (mesh size=38 μm) was fused into a plastic support cylinder 60 mm in internal diameter, and the water-absorbing resin W(g)(0.900 g) were distributed thereon. On the water-absorbing resin W, a piston and a load were subsequently placed in this order. The piston was slightly smaller than 60 mm in external diameter so that there was no gap between itself and the support cylinder but allowed the piston to smoothly move vertically. With this, a 4.8 kPa load was applied evenly to the water-absorbing resin. Before the load was placed, the whole weight of the measurement unit except for the load was measured as W3(g)=(weight of support cylinder+weight of water-absorbing resin+weight of piston) A glass filter (Sogo Laboratory Glass Works CO. LTD: porous diameter=100 to 120 μm) 90 mm in diameter 5 mm in thickness was placed on an internal surface of Petri dish 150 mm in diameter. 0.90 weight % physiological saline solution adjusted to 25±2° C. was poured into the Petri dish so that the surface came to the same level as the upper face of the glass filter. Further thereon, a paper filter 90 mm in diameter (TOYO Roshi (ADVANTEC) No.2) was placed so that the surface was completely soaked. Then the extra liquid was removed.

The whole measurement system was placed on the wet paper filter, and the liquid was absorbed to the paper under pressure. When the liquid surface decreased below the upper face of glass filter, extra liquid was added to maintain the same liquid level. After an hour, the whole measurement unit was lifted up and the weight W4 (g) excluding the load (weight of the support cylinder+the water-absorbing resin+weight of piston) was measured. With the weights W3 and W4, the absorption against pressure (g/g) was found according to the following formula.

$AAP(g/g)$=(weight $W4(g)$−weight $W3(g)$)/$W(g)$

Example 1

37.1 parts of acrylic acid, 5.4 parts of 1% polyethylene glycol diacrylate (average molecule mass=522) aqueous solution, and 0.23 part of 1% pentasodium diethylene triamine pentaacetate was mixed together in a 250 ml polypropylene resin container so as to prepare an acrylic acid aqueous solution. The acrylic acid aqueous solution was stirred with a magnetic stirrer, while adding 0.9 part of commercially-available starch (potato starch) so that the starch particles are dispersed, so as to prepare a dispersion solution. Thereafter, 29.7 parts of 48.5% sodium hydroxide aqueous solution and 25.0 parts of water are mixed and heated to about 42° C., and then the mixture solution was further mixed with the foregoing dispersion solution. The mixture solution was immediately heated up by heat of neutralization to 103° C., and the starch particles dispersing therein were immediately dissolved. A monomer aqueous solution for polymerization was thus obtained.

At the time where the monomer aqueous solution was dropped to 95° C., 2.6 parts of 2% sodium persulfate aqueous solution was added as a polymerization initiator. After 3 seconds, polymerization began. The polymerization proceeded as the solution was swollen upward like a balloon and got out of the container. Then the balloon started shrinking and was contained within the container again. After 5 minutes, the hydrous polymer was taken out of the container, and cut into 1 to 5 mm pieces by scissors. Then the pieces are placed on a metal gauze so as to be dried by 180° C. hot air for 20 minutes. The dried product was smashed by a roll-mill, and the resulting particles were classified by some sieves. With this, a particulate water-absorbing resin (1) which passed through a 600 μm mesh sieve but was caught by a 300 μm mesh sieve was obtained.

The particulate water-absorbing resin (1) was observed by an optical microscope, and many small bubbles were seen therein.

The absorption ratio and the soluble amount of the particulate water-absorbing resin (1) thus found are shown in Table 1.

Example 2

The same experiment as that of Embodiment 1 was carried out except that a polyvinyl alcohol ("Gosenol GH-17" (saponification degree=86.5 to 89.0) provided by NIPPON GOHSEI Co. Ltd.), which passes through a sieve with 212 μm meshes, was used instead of the starch. Obtained was a water-absorbing resin (2). Also in this example, the polyvinyl alcohol was immediately-dissolved in the monomer aqueous solution for polymerization, as with Example 1.

The particulate water-absorbing resin (2) was observed by an optical microscope, and many tiny bubbles, but less amount than Example 1, were seen therein.

The absorption ratio and the soluble amount of the particulate water-absorbing resin (2) thus found are shown in Table 1.

Example 3

The same polymerization as that of Example 1 was carried out except that 4.5 parts of "Soluble Starch" (provided by WAKO CHEMICAL Co. Ltd.) was used instead of the starch. As a result, a hydrous polymer was obtained.

The hydrous polymer was smashed in the same manner as that of Example 1, and was dried by 70° C. hot air for 3 hours, and was further dried in vacuum at 40° C. The dried product was smashed by a bench crusher, and the resulting particles were classified by some sieves. With this, a particulate water-absorbing resin (3) which passed through a 600 μm mesh sieve but was caught by a 300 μm mesh sieve was obtained.

The absorption ratio and the soluble amount of the particulate water-absorbing resin (3) thus found are shown in Table 1.

Example 4

The same experiment as that of Example 3 was carried out except that the amount of starch was changed to 13.5 parts. Obtained was a water-absorbing resin (4).

The monomer aqueous solution for polymerization and the hydrous polymerization product resulting from the polymerization were slightly whitish, but there were no chunks or particles of starch in the product. The product was a homogeneous gel, The absorption ratio and the soluble amount of the particulate water-absorbing resin (4) thus found are shown in Table 1.

TABLE 1

|  | Absorption Ratio (g/g) | Soluble Amount (weight %) |
|---|---|---|
| Example 1 | 35 | 15 |
| Example 2 | 49 | 21 |
| Example 3 | 25 | 4.8 |
| Example 4 | 26 | 18 |

* the character in the bracket denotes unit

Example 5

The same experiment as that of "Example 1," was carried out except that the particles resulted from the smashing with a roll-mill were classified by a sieve with 850 μm meshes instead of the classification to obtain particles less than 600 μm but larger than 300 μm. A particulate water-absorbing resin (5) was thus obtained.

The absorption ratio (g/g), soluble amount (weight %) of the particulate water-absorbing resin (5) were 35.5 g/g and 14.8 weight %, respectively. The entire water-absorbing resin contained particles which pass through 150 μm meshes in an amount of 5.1 weight %.

Comparative Example 1

20.6 parts of acrylic acid, 3.0 parts of 1 weight % polyethylene glycol diacrylate (average molecule mass=522), 56.9 parts of ion exchange water, and 7.5 parts of the "Soluble Starch" (provided by WAKO CHEMICAL Co. Ltd.) of Example 3 were mixed together in a 1 L polypropylene resin container so as to prepare a dispersion solution. While keeping the dispersion solution at about 25° C., 16.5 parts of 48.5 weight % sodium hydroxide aqueous solution was dropped into the dispersion solution to neutralize the solution, so as to prepare a monomer aqueous solution. The monomer aqueous solution was murky white.

Next, the monomer aqueous solution was subjected to nitrogen substitution by blowing nitrogen gas into the monomer solution. Then, 2.9 parts of 1 weight % 2,2-azobis(2-amidinopropane) dihydrochloride (product name: V50, provided by WAKO CHEMICAL Co. Ltd.) was mixed with the solution, and the container was sealed with a quartz lid. Then the container was irradiated with ultraviolet to cause polymerization. The temperature was 25° C. when the polymerization began. The polymerization proceeded with the solution still uneven and murky white. After confirming that the solution reached the maximum temperature, which was 55° C., the solution kept sealed in the container was left for an hour. After that, the polymerization product was taken out and cut into a pieces of 1 mm to 5 mm in diameter by scissors. The pieces were dried by hot air of 180° C. for 20 minutes.

Then the dried product was smashed by a roll-mill, and the resulting particles were classified by a sieve with 850 μm meshes. With this, a comparative particulate water-absorbing resin (1) was obtained.

The absorption ratio and the soluble amount of the comparative particulate water-absorbing resin (1) were 25 g/g and 44.8 weight %, respectively. The entire water-absorbing resin contained particles which pass through a sieve of 150 μm meshes in an amount of 5.5 weight %.

Example 6

A surface crosslinking agent made of 0.4 part of 1.4-butanediol, 0.6 part of propyleneglycol, 3.0 part of ion exchange water, and 0.5 part of isopropanol was sprayed into 100 parts of the particulate water-absorbing resin (1) of Example 1 and the resin and the agent were mixed. The mixture was heated for 40 minutes at 210° C. Obtained was a particulate water-absorbing resin (6) with a crosslinked surface.

Examples 7 through 10

The same experiment as that of Example 6 was carried out four more times respectively using the particulate water-absorbing resins (2) through (5) of Examples 2 through 5 instead of the particulate water-absorbing resin (1). Obtained were particulate water-absorbing resins (7) through (10) with crosslinked surfaces.

Comparative Example 2

The same experiment as that of Example 6 was carried out using the comparative particulate water-absorbing resin (1) of Comparative Example 1 instead of the particulate water-absorbing resin (1). Obtained was a comparative particulate water-absorbing resin (2) with a crosslinked surface.

The respective absorption ratios and absorption ratios against pressure of the particulate water-absorbing resins (6) through (10) and the comparative particulate water-absorbing resin (2) were measured. The measurement results are shown in Table 2.

TABLE 2

|  | Absorption Ratio (g/g) | AAP1.9 (g/g) | AAP4.8 (g/g) |
|---|---|---|---|
| Example 6 | 30 | 29 | 27 |
| Example 7 | 34 | 30 | 25 |
| Example 8 | 25 | 23 | 25 |
| Example 9 | 25 | 23 | 23 |
| Example 10 | 30 | 23 | 28 |
| Comparative Example 2 | 24 | 16 | 13 |

* "AAP1.9" denotes an absorption ratio against pressure of 1.9 kPa, and "AAP4.8" denotes an absorption ratio against pressure of 4.8 kPa.

The present invention is not limited to the description of the embodiments above, but may be altered by a skilled person within the scope of the claims.

As described, according to the production method of the present invention, particles of a hydrophilic high-molecular-weight compound are dispersed in a monomer aqueous solution, and the particles are dissolved into the solution by heat of neutralization, heat of hydration, and/or heat of polymerization. With such an arrangement, the production process of the present invention is simpler and the production cost is lower, compared with the conventional method. Further, the production method of the present invention ensures a desired productivity of the hydrophilic polymer even in mass production.

With these features, the production method of the present invention is useful for production of a water-absorbing resin obtained by polymerizing a monomer solution mainly containing an acrylic acid and/or its sodium salt, or a hydrophilic polymer such as a water-soluble resin, including a polyacrylic acid (salt)-type resin and a polyacrylamide-type resin.

The embodiments and concrete examples of implementation discussed in the foregoing detailed explanation serve solely to illustrate the technical details of the present invention, which should not be narrowly interpreted within the limits of such embodiments and concrete examples; but rather may be applied in many variations within the spirit of the present invention, provided such variations do not exceed the scope of the patent claims set forth below.

What is claimed is:

1. A production method for a hydrophilic polymer, comprising the steps of:
   (1) mixing a solution containing a hydrophilic monomer and a compound which disperses in the solution while the solution is stirred, so as to prepare a dispersion solution of the compound; and
   (2) polymerizing the hydrophilic monomer in the solution, and heating the dispersion solution by heat of polymerization generated by the polymerization, so as to dissolve at least a part of the compound dispersed therein,
   wherein the compound which disperses in the solution containing the hydrophilic monomer is a compound which is dispersible in an aqueous solution having a temperature of 0° C. to 40° C., and
   wherein the compound which disperses in the solution containing the hydrophilic monomer has a solubility of 2 g or more with respect to 100 g of water having a temperature of 60° C.

2. A production method for a hydrophilic polymer, comprising the steps of:
   (a) mixing a solution containing a monomer containing an acid group and a compound which disperses in the solution while the solution is stirred, so as to prepare a dispersion solution of the compound;
   (b) mixing the dispersion solution with a neutralizing agent capable of neutralizing the monomer containing an acid group so as to neutralize the monomer containing an acid group; and heating the dispersion solution by heat of neutralization and/or heat of hydration generated by the neutralization, so as to dissolve at least a part of the compound dispersed therein; and
   (c) polymerizing the monomer containing an acid group in the dispersion solution having been neutralized in the step (b),
   wherein the compound which disperses in the solution containing the hydrophilic monomer is a compound which is dispersible in an aqueous solution having a temperature of 0° C. to 40° C., and
   wherein the compound which disperses in the solution containing the hydrophilic monomer has a solubility of 2 g or more with respect to 100 g of water having a temperature of 60° C.

3. A production method for a hydrophilic polymer, comprising the steps of:
   (a) mixing a solution containing a monomer containing an acid group and a compound which disperses in the solution while the solution is stirred, so as to prepare a dispersion solution of the compound;
   (b) mixing the dispersion solution with a neutralizing agent capable of neutralizing the monomer containing an acid group so as to neutralize the monomer containing an acid group; and heating the dispersion solution by heat of neutralization and/or heat of hydration generated by the neutralization, so as to dissolve a part of the compound dispersed therein; and
   (c) polymerizing the monomer containing an acid group in the dispersion solution having been neutralised in the step (b), and dissolving at least a part of the compound dispersed in the dispersion solution having been neutralized by heat of polymerization generated by the polymerization,
   wherein the compound which disperses in the solution containing the hydrophilic monomer is a compound which is dispersible in an aqueous solution having a temperature of 0° C. to 40° C., and
   wherein the compound which disperses in the solution containing the hydrophilic monomer has a solubility of 2 g or more with respect to 100 g of water having a temperature of 60° C.

4. The production method for a hydrophilic polymer as set forth in claim 1, wherein a maximum temperature of a polymer heated by the heat of polymerization is 100° C. or greater.

5. The production method for a hydrophilic polymer as set forth in claim 2, wherein a maximum temperature of a polymer heated by the heat of polymerization is 100° C. or greater.

6. The production method for a hydrophilic polymer as set forth in claim 3, wherein a maximum temperature of a polymer heated by the heat of polymerization is 100° C. or greater.

7. The production method for a hydrophilic polymer as set forth in claim 1, wherein the hydrophilic monomer is a monomer containing an acid group.

8. The production method for a hydrophilic polymer as set forth in claim 2, wherein, in the step (b), the neutralization is continued until a neutralization ratio becomes 50 to 85 mol %.

9. The production method for a hydrophilic polymer as set forth in claim 3, wherein, in the step (b), the neutralization is continued until a neutralization ratio becomes 50 to 85 mol %.

10. The production method for a hydrophilic polymer as set forth in claim 1, wherein at least 50% of the total content of the monomer containing an acid group or the hydrophilic monomer is an acrylic acid and/or its alkali metal salt.

11. The production method for a hydrophilic polymer as set forth in claim 2, wherein at least 50% of the total content of the monomer containing an acid group or the hydrophilic monomer is an acrylic acid and/or its alkali metal salt.

12. The production method for a hydrophilic polymer as set forth in claim 3, wherein at least 50% of the total content of the monomer containing an acid group or the hydrophilic monomer is an acrylic acid and/or its alkali metal salt.

13. The production method for a hydrophilic polymer as set forth in claim 1, wherein the hydrophilic polymer is a water-soluble polymer and/or a water-absorbing resin.

14. The production method for a hydrophilic polymer as set forth in claim 2, wherein the hydrophilic polymer is a water-soluble polymer and/or a water-absorbing resin.

15. The production method for a hydrophilic polymer as set forth in claim 3, wherein the hydrophilic polymer is a water-soluble polymer and/or a water-absorbing resin.

16. The production method for a hydrophilic polymer as set forth in claim 1, wherein the compound is a powder compound which is solid at ordinary temperature.

17. The production method for a hydrophilic polymer as set forth in claim 2, wherein the compound is a powder compound which is solid at ordinary temperature.

18. The production method for a hydrophilic polymer as set forth in claim 3, wherein the compound is a powder compound which is solid at ordinary temperature.

19. The production method for a hydrophilic polymer as set forth in claim 16, wherein at least 90% of particles of the powder compound which is solid at ordinary temperature are not more than 5 mm in diameter.

20. The production method for a hydrophilic polymer as set forth in claim 17, wherein at least 90% of particles of the powder compound which is solid at ordinary temperature are not more than 5 mm in diameter.

21. The production method for a hydrophilic polymer as set forth in claim 18, wherein at least 90% of particles of the powder compound which is solid at ordinary temperature are not more than 5 mm in diameter.

22. The production method for a hydrophilic polymer as set forth in claim 16, wherein the powder compound which is solid at ordinary temperature is a hydrophilic high-molecular-weight compound.

23. The production method for a hydrophilic polymer as set forth in claim 17, wherein the powder compound which is solid at ordinary temperature is a hydrophilic high-molecular-weight compound.

24. The production method for a hydrophilic polymer as set forth in claim 18, wherein the powder compound which is solid at ordinary temperature is a hydrophilic high-molecular-weight compound.

* * * * *